(12) United States Patent
Francisquini

(10) Patent No.: US 8,091,970 B2
(45) Date of Patent: Jan. 10, 2012

(54) METALLIC STRUCTURE IMPROVEMENT FOR MANUFACTURING ELECTRICAL CABINETS/PANELS

(76) Inventor: Melquisedec Francisquini, Sao Paulo (BR)

( * ) Notice: Subject to any disclaimer, the term of this patent is extended or adjusted under 35 U.S.C. 154(b) by 951 days.

(21) Appl. No.: 10/574,746

(22) PCT Filed: Oct. 7, 2004

(86) PCT No.: PCT/BR2004/000194
§ 371 (c)(1),
(2), (4) Date: Jul. 24, 2008

(87) PCT Pub. No.: WO2005/034302
PCT Pub. Date: Apr. 14, 2005

(65) Prior Publication Data
US 2008/0272677 A1 Nov. 6, 2008

(51) Int. Cl.
*A47G 29/00* (2006.01)
(52) U.S. Cl. .................. 312/265.1; 312/265.3; 211/26; 211/192
(58) Field of Classification Search .... 312/265.1–265.4, 312/223.3, 334.4, 111, 257.1, 140; 211/26, 211/207, 190, 191, 192, 189; 361/724–727; 403/263–272
See application file for complete search history.

(56) References Cited

U.S. PATENT DOCUMENTS

| | | | | | |
|---|---|---|---|---|---|
| 2,058,263 | A | * | 10/1936 | Rosendale | 312/265.4 |
| 3,513,606 | A | * | 5/1970 | Jones | 52/27 |
| 3,542,407 | A | * | 11/1970 | Brown | 403/172 |
| 3,736,035 | A | * | 5/1973 | Brown et al. | 312/107 |
| 3,890,022 | A | * | 6/1975 | Moon | 312/140 |
| 4,126,364 | A | * | 11/1978 | Reilly | 312/140 |
| 4,299,508 | A | * | 11/1981 | Kerscher et al. | 403/172 |
| 4,380,110 | A | * | 4/1983 | Harig | 29/525 |
| 4,515,494 | A | * | 5/1985 | Robilliard et al. | 403/187 |
| 4,796,541 | A | * | 1/1989 | Halstrick | 108/107 |
| 4,928,834 | A | * | 5/1990 | Neiman | 211/191 |
| 4,971,281 | A | * | 11/1990 | Steinbeck | 248/222.13 |

(Continued)

FOREIGN PATENT DOCUMENTS
EP 0 948 916 A1 10/1999
(Continued)

*Primary Examiner* — Darnell Jayne
*Assistant Examiner* — Hiwot Tefera
(74) *Attorney, Agent, or Firm* — William J. Sapone; Coleman Sudol Sapone P.C.

(57) ABSTRACT

IMPROVEMENT TO THE METALLIC STRUCTURE FOR MANUFACTURING ELECTRICAL PANELS/CABINETS, enclosing a structure of metallic cross sections (5), with the device for supporting the parts making up the external walls from folded sheets, as well as constituting the device for supporting and mounting the doors with its respective hinges and other accessories, such as: the upper (6) and lower enclosure with the base (7) and other components, being that, still, same structure, although, on the inside, also configures the necessary mounts for distributing and assembling the different electrical and electronic components and devices; in the first construction version, the said structure (5) presented semi-assembled, where four of its uprights or four of its cross sections (P1) are completely free while all the other cross sections are rigidly integrated into two equal rectangular frames (8) which form the two opposite sides of the said structure (5) and therefore at the corner point of the junction of each rectangular frame (8) there is a complementary device (9) cooperating for the interlinking at 90° between two adjacent cross sections (P2) and (P3) of each frame (8), as also this selfsame device presents the mechanism so that the extremities of the other cross sections (P1) may be coupled between the corners of the rectangular frames (8), thus forming the structure (5).

6 Claims, 22 Drawing Sheets

U.S. PATENT DOCUMENTS

| | | | | |
|---|---|---|---|---|
| 5,003,741 A | * | 4/1991 | Yeh | 52/280 |
| 5,048,995 A | * | 9/1991 | Beaulieu | 403/264 |
| 5,190,172 A | * | 3/1993 | Tyson | 211/191 |
| 5,451,115 A | * | 9/1995 | Sayres | 403/171 |
| 5,458,428 A | * | 10/1995 | West | 403/252 |
| 5,695,263 A | * | 12/1997 | Simon et al. | 312/265.4 |
| 6,070,957 A | * | 6/2000 | Zachrai | 312/334.4 |
| 6,123,400 A | * | 9/2000 | Nicolai et al. | 312/265.1 |
| 6,155,434 A | * | 12/2000 | Benner et al. | 211/26.2 |
| 6,174,034 B1 | * | 1/2001 | Benner et al. | 312/265.4 |
| 6,270,283 B1 | * | 8/2001 | Turati | 403/217 |
| 6,315,132 B1 | * | 11/2001 | Hartel et al. | 211/26 |
| 6,332,657 B1 | * | 12/2001 | Fischer | 312/111 |
| 6,471,434 B2 | * | 10/2002 | Chin et al. | 403/175 |
| 6,516,955 B1 | * | 2/2003 | Dudhwala et al. | 211/26 |
| 6,682,253 B2 | * | 1/2004 | Binna et al. | 403/263 |

FOREIGN PATENT DOCUMENTS

FR     2 674 581 A     10/1992

* cited by examiner

METALLIC STRUCTURE IMPROVEMENT FOR MANUFACTURING ELECTRICAL CABINETS/PANELS

FIELD OF INVENTION

This invention refers to a metallic structure assembled with a combination of different components, including special cross sections, notably of the type formed in an extruder, defining the structure with a constructively differentiated concept from which some technical and practical improvements are obtained, including quality with cost reduction.

This type of structure in a general manner is normally used in the most varied of cabinet types also known as electrical panels, which in reality are cabinets with doors and closed off sides used to house a very large variety of electrical and electronic components and devices.

BACKGROUND

As it is common knowledge of those qualified in this technique, currently there are different types of electrical panels also called frames or cabinets, designed to house the most varied of components in the most varied of activity fields also including the telephony sector.

Therefore under different electrical distribution conditions or assembly of electrical or electronic components and devices, the use of a cabinet or panel is extremely important.

Although currently there are a very large variety of electrical panels, these are normally metallic boxes with appropriate enclosure, including one or more doors depending on its dimensions. Such enclosures including the doors are normally manufactured from substantially thin metallic plates. In this manner all electrical panels internally have a metallic cross section structure. This structure as the name itself says constitutes the supporting means for the parts that make-up the external walls from folded sheets the door assembly and its respective hinges, and still, this same structure, although, on the inside, also configures the necessary mountings for distribution and assembly of the different electrical and electronic components and devices.

It is logically fundamental that any electrical panel has an internally substantially resistant structure to characterize a cabinet suitable to the equipment to be installed internally.

Currently there are different types of structures all of them made from metallic cross sections, within which in most of the cases are formed by sheet steel bending presses, which makes the production process difficult besides presenting a few technical difficulties, there are also other types of structures made from metallic cross sections shaped in extruders, such as those show in the following documents:

a) PI 8406283—mounting framework for a distribution cabinet deposited on 7 Jul. 1984;

b) PI 9509578-0—published on 23 Dec. 1997—mounts for a distribution cabinet;

c) PI 9713114-8A—published on 11 Apr. 2000—framework with a back structure and a covering structure from a drilled foil;

d) PI 9509594-2—published on 30 Sep. 1997—framework for a distribution cabinet;

e) PI 9708041-1—published on 27 Jul. 1999—distribution cabinet with a framework structure;

f) PI 9712774-4A—published on 26 Oct. 1999—distribution cabinet with and aluminium square frame;

g) PI 9713518-6A—panel framework for a distribution cabinet; and h) PI 9713515-1A—panel framework set with corner connections for the panel's vertical cross sections.

It is important to highlight that the electrical distribution panels and cabinets are designed to affect two TYPES of commercially defined applications, such as: INDOOR type (sheltered use) and OUTDOOR type (unsheltered use—exposed to the elements). The difference between the two types basically consists of the DEGREE OF MECHANICAL PROTECTION AND SEALING of the side enclosures and doors consequently we can say that the those defined as the outdoor type presents a greater degree of mechanical protection as well as sealing.

Traditionally the indoor type is considered suitable to be used in an enclosed environment closed and protected from the elements, whilst the other type defined as outdoor is ideal to be used in open locations or open air, such as is the case for example with some cabinets used in telephony sector. Nevertheless the outdoor type due to its greater degree of sealing is also advantageously used in closed environments but with hostile activities, not only due to the presence of pollutants suspended in the air but also due to the presence of humidity, such as is the case for example in industries, processing environments for various products notably so in the chemical sector, industrial kitchens and or other similar locations.

PROBLEMS OF THE PRIOR ART

There currently are as has been said various types of structures and in most cases the structural effect obtained is reasonably satisfactory, nevertheless, with reference to seals, special technical operations are needed for its application, as well as presenting complicated industrial manufacturing in some cases due to the absence of technology, in others due to the need of complementary accessories as it happens for example in PI 8406283—mounting framework for a distribution cabinet deposited on 7 Dec. 1984, where the junction of the corners are obtained by a Zamak connection cast under pressure with three connection points (supposedly with the function of facilitating the assembly of the unit or maybe to offer better stability), nevertheless this type of solution has elevated costs and it also makes it impossible for the cross sections to be welded to the connectors as they are different materials, so welding is restricted to the points where the cross sections meet, which results in a lower mechanical stability for the structure although it is of the structurally welded type. We could also cite the PI 9.713.518-6A—panel framework for a distribution cabinet, the PI 9.713.114-8A—framework for a back structure and a covering structure with a drilled foil. In these and other cases it is noted that the corners consist of a single piece made from steel, which enables welding between the connectors and cross sections, nevertheless this solution utilises two different cross sections for constructing the structure, one in the vertical assembly and the other on the horizontal, which is evidently, besides adding to the cost also interferes with the manufacturing of the unit, making it complicated.

In the first usual instance we may say that structures obtained from metallic cross sections shaped in extruders are normally of the structurally welded type (ready frame), that is a structure with parallel sides which cannot be taken apart, where all the cross section junctions at the corners are welded, this supposedly so to guarantee better rigidity and stability. Nevertheless this assembly concept competes to characterize various technical and practical disadvantages among which we may highlight: adds to the increased manufacturing cost; its transport and storage become substantially more difficult, seeing that the assembled structure requires a considerable amount of space to be occupied.

Under a second usual condition we may say that there are other types of disassembled structures, that is, structurally assembled with screws, where each one represents its respective construction characteristic, nevertheless, these existing solutions do not present satisfactory rigidity or mechanical stability for the destined applications.

Therefore in summary we can say that the inconveniences of the structures under the condition of the techniques are generated as a result of the manufacturing complexity, inefficiency for the more stringent applications, such as: Telecommunication and Medium Voltage, which requires the outdoor type (unsheltered use), incompatible mechanical stability and rigidity especially in the disassembled types.

SUMMARY OF THE INVENTION

In the face of the abovementioned circumstances and with the objective of overcoming them the current invention was created, which in its final form defined a perfected structure where under one selfsame constructive characteristic it was possible to make the assembled version (structurally welded internally and externally throughout the perimeter's joints and corners) or the semi disassembled version (partially welded structure welded internally and externally at the cross section junctions for the width and height as well as the complementary assembly of the depth cross sections by means of screws), using a single cross section and still being able to support the mounting elements for the internal components with flexibility and safety, both for the assembly of the indoor and outdoor type electrical panels, including with a series of technical and practical advantages, among which these stand out:

a) the corner joints are characterised by their simple construction, technical efficiency and versatility, seeing that the connection that makes the joining of the two cross sections consists of a single piece (a square dowel from square steel), and it being used in the assembled as well as the semi-assembled version, and it may be easily manufactured from other materials, such as forged or cast steel etc.;

b) the use of a single cross section for the structure or, that is, the same cross section for the width as for the height and depth, besides facilitating manufacture also significantly reduces cost;

c) the manner of assembly in question associated to the transversal geometry of the cross section made it possible for a new technical effect of extreme importance, that is, all of the structure's assembled sides are symmetrically equal, which in a way favours the interlinking of one structure to the other on any of the other sides, including the top and bottom, consequently the current structure is modular and may be increased or decreased at any desired moment;

d) the outside of the structure is completely sealed in relation to the inside, this seal is naturally obtained with the said transversal geometry of the cross section in conjunction with the extrusion details, also as well as this seal is possible with the perfect joining of all the cross sections on each of the corners;

To understand these objectives the current improvement foresees a first constructive version as defined by the joining of the corners by two dowels in such a manner that on the one side one dowel may present details so that two cross sections at right angles on the one corner of the structure may be rigidly welded, as what happens to all the other corners, forming the first part of the structure in the shape of a rectangular frame. Each structure has two rectangular frames which are interlinked with the other four completely loose cross sections, therefore, its ends are fitted with other dowels, all of them with details to be coupled by means of screws and fittings with the other dowels welded to the referred to frames, thus finalizing the means so that the said structure may be supplied completely disassembled, consequently, all the other technical and practical advantages previously commented on arise.

Finally, for some cases where the structure needs to be in one piece and not disassembled, the present improvement foresees a simplified and efficient constructive manner to achieve the aim, where only one steel dowel (connection for joining the corners) affords the means for welding on all the edges of the cross sections which are to be found on each corner of the structure, this welding is also extended to the corresponding faces of the referred to dowel, in such a manner that it comes to be an integral part of all the cross sections which are to be found in each corner, thus finalizing a constructive manner which considerably increases the rigidity of the structure.

BRIEF DESCRIPTION OF THE DRAWINGS

To better understand the current Invention the following description is made in detail, making references to the attached drawings, where.

DETAILED DESCRIPTION OF THE INVENTION

Figure 1:
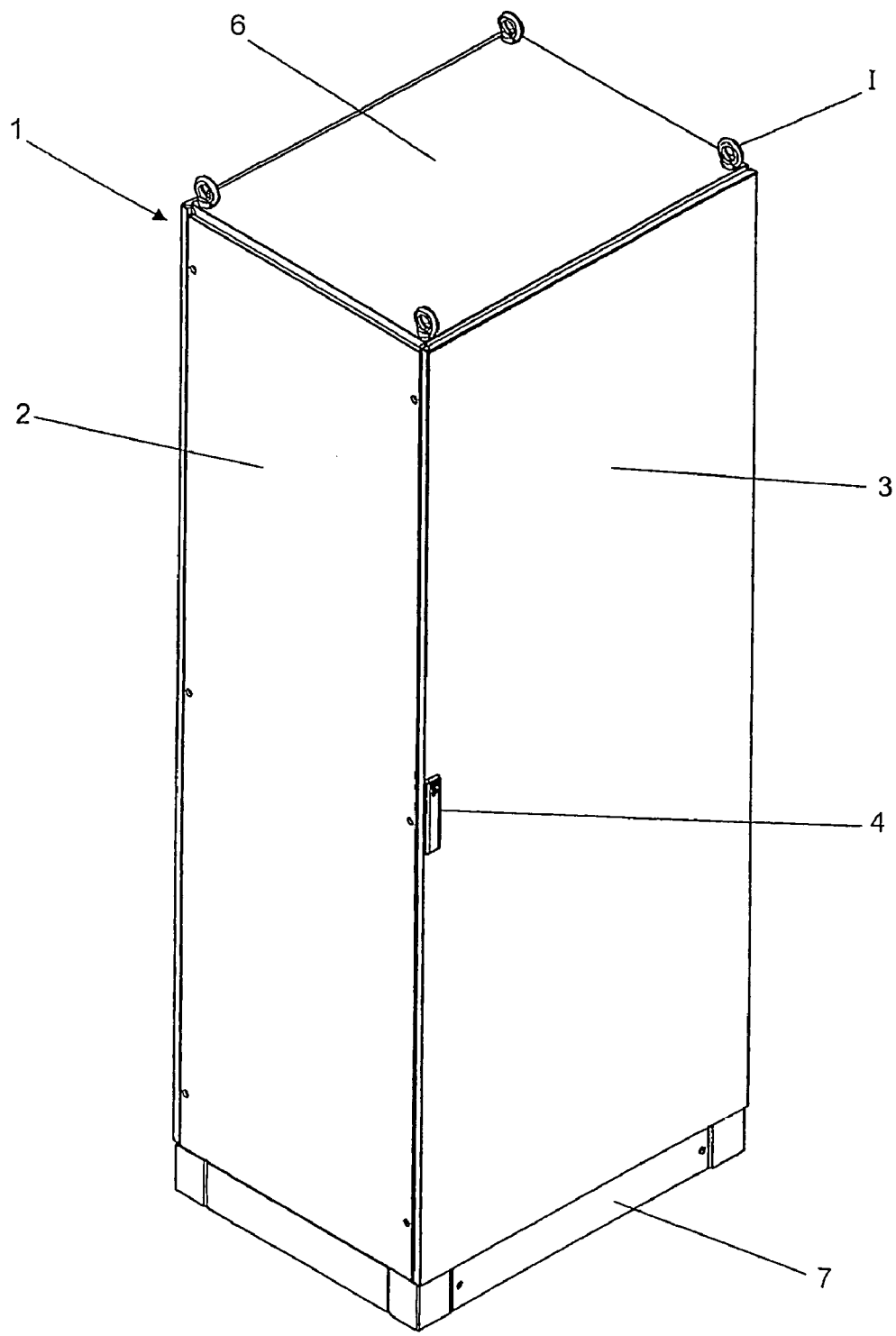
FIG. 1 represents a view in perspective exemplifying a completely enclosed electrical panel and obtained with the current improvement.
Figure 2:
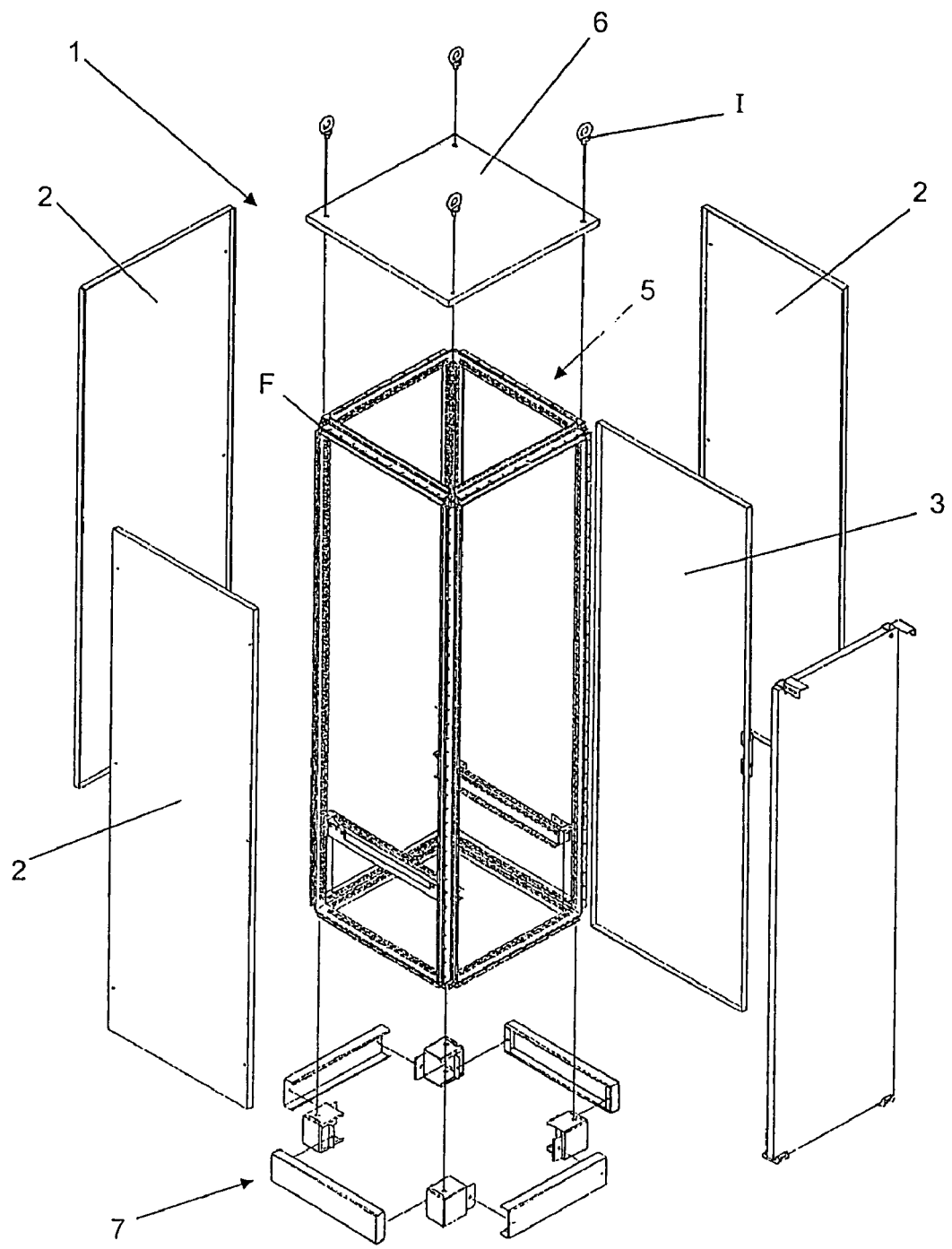
FIG. 2 is an exploded view of the electrical panel showed in the previous figures, highlighting its structure obtained with the current cross section.

According to these illustrations and its details the current improvement to the metallic structure was particularly developed for mounting electrical cabinets or panels (1), generically shown in FIGS. 1 and 2, where only one type of example can be seen, which may be either indoor or outdoor, but, in both cases, the same is shown in the form of a metallic box with enclosed sides (2), including one or more tilting doors (3) with a lock (4). Such enclosures including the doors are normally manufactured from substantially thin metallic plates. In this manner, also as illustrated in FIG. 2, all electrical panels have an internal metallic cross section structure (5), through which can be seen that this structure, as the name itself says, constitutes the supporting means for the parts that make up the external walls from folded sheets, as it also constitutes the supporting and assembly means for the doors and its respective hinges as well as other accessories, such as: upper (6) and lower enclosures with the base (7) and other components which are not shown, still being that the same structure, although on the inside, also has a configuration of the necessary fittings to distribute and mount the different electrical and electronic components and devices (not shown).

Still in relation to FIG. 2 it is logical and fundamental that any electrical panel has an internal structure (5) substantially resistant enough to characterise a cabinet fitted with the internal equipment to be installed. This illustrated structure may be obtained with different metallic cross sections nevertheless the current improvement is aimed at perfecting the junctions of the cross sections on the corners of the structures.

Figure 3:
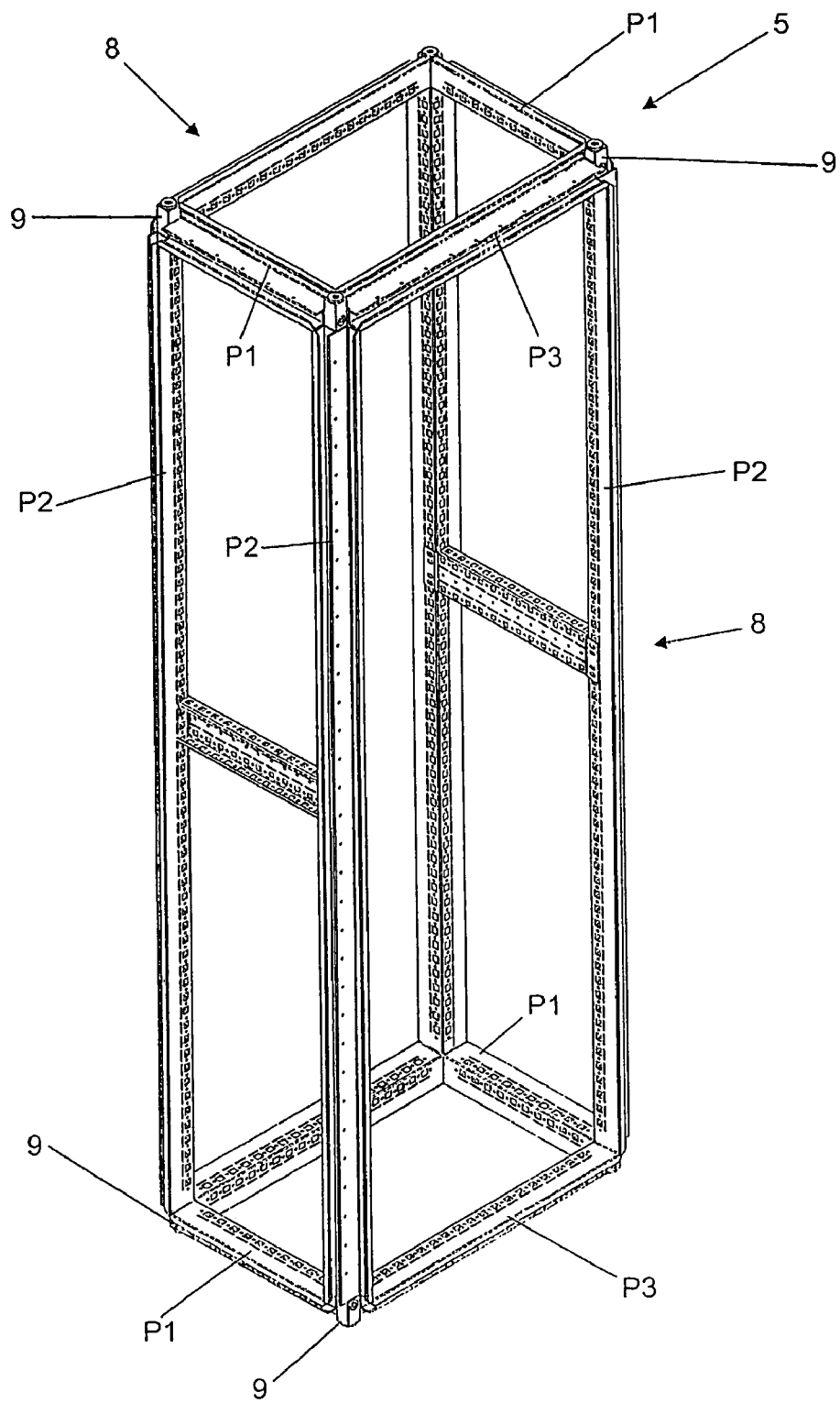
FIG. 3 shows a view in perspective of a structure obtained with the cross section in question.
Figure 4:
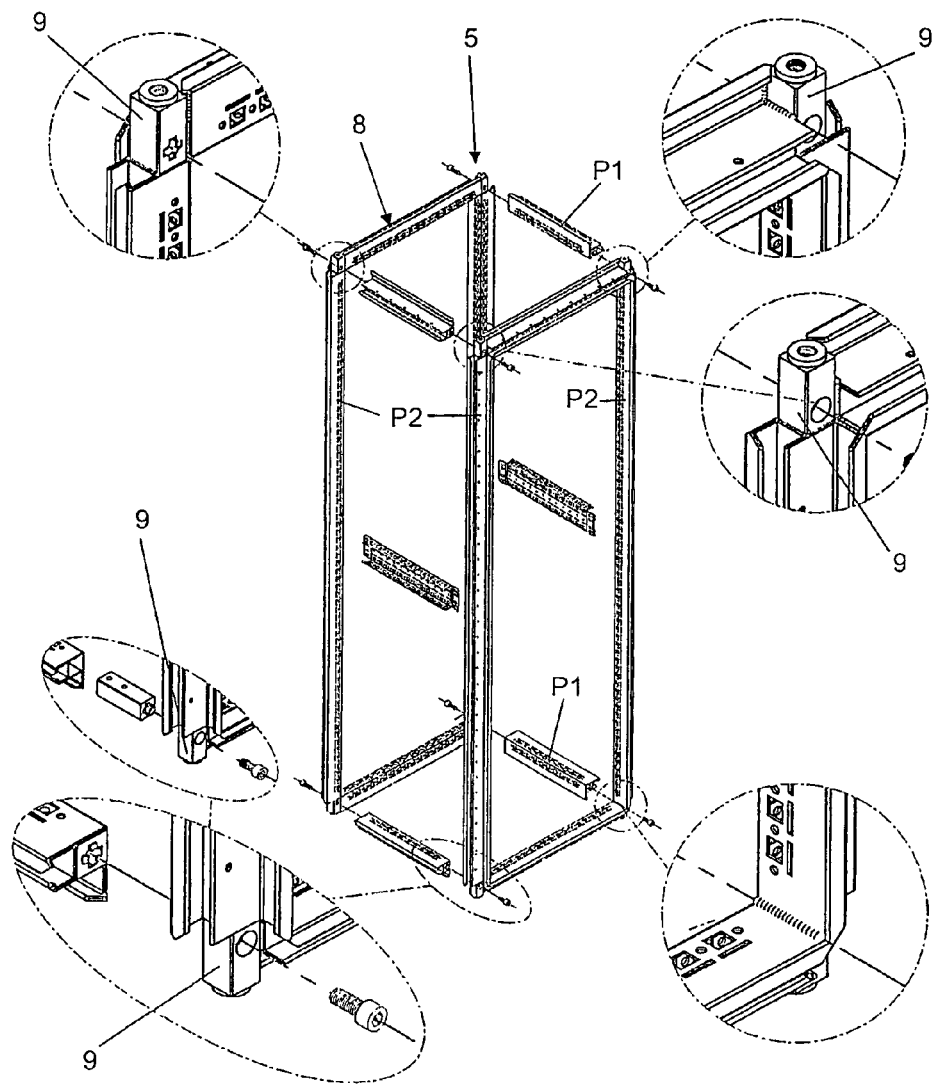
FIG. 4 shows a view in perspective of a structure obtained with the cross section in question, this structure is partially exploded and still in this same view are shown the amplified details of all the corners of the said structure.
Figure 5:
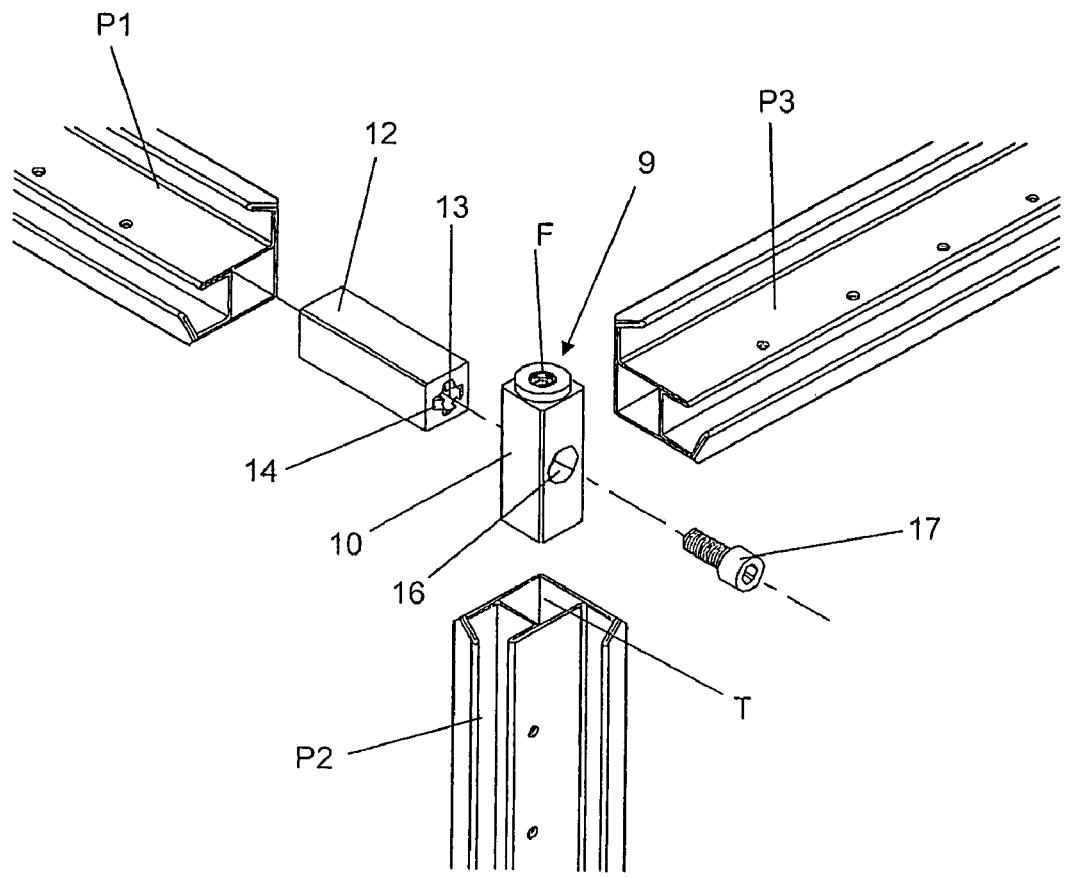
FIG. 5 shows an amplified and exploded view, highlighting the assembly components of one of the structure's corners.
Figure 6:
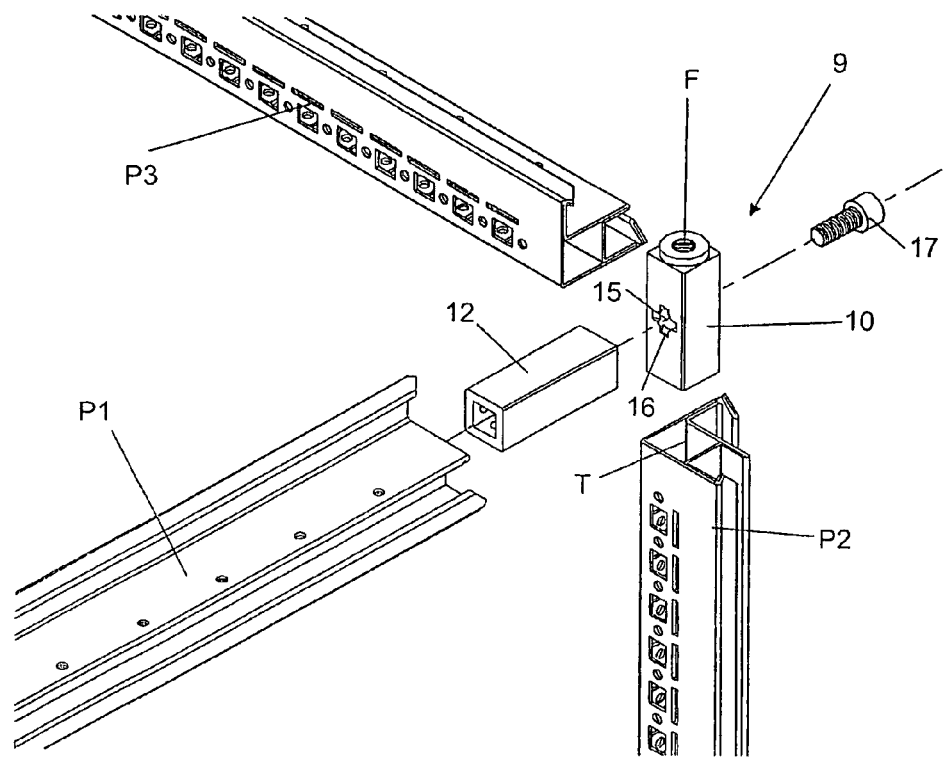
FIG. 6 is an exploded view equal to the previous one but at a different angle, showing other construction details of the components, which make up each corner of the structure.

In relation to FIGS. 3 and 4, in a first construction version the current improvement is characterized by the fact of the said structure (5) shown semi assembled, where four of its uprights or four of its cross sections (P1) are completely free whilst all the other cross sections are rigidly integrated in two equal rectangular frames (8) which make up the two opposite sides of the said structure (5) and therefore at the corner junction point of each rectangular frame (8) there exists a complementary device (9) cooperative for interlinking at 90° between two adjacent cross sections (P2) and (P3) of each frame (8), also as this same device presents the means so that the extremities of the other cross sections (P1) may be coupled between the corners of the rectangular frames (8), thus forming the structure (5).

As is also shown in FIGS. 5, 6, 7 and 8, the complementary device (9) is made up of a dowel of a square transversal section (10), is sized so that its lower end can penetrate in a tight fitting manner inside the tubular part (T) of the cross sections (P2), whilst its upper extremity, besides including a vertically threaded hole (F), usually, remains sufficiently exposed according to a height compatible to the adjacent cross section (P3), in such a manner that the said point and the two cross sections (FIG. 7) may be joined by welding (11), thus forming that substantially rigid rectangular frame (8) and at the same time, the four corners of each frame (8) also have the configuration for the means of coupling to the cross sections (P1) which in the same manner receive the other dowels (12), having one end fitted into the tubular part (T) of cross section (P1), where the said end is fastened by screws in the side, whilst the other end presents a longitudinal threaded hole (13) and a self locking fitting from the top (14), in cooperation to be to be inserted into the other (15) existing on the side face of the other dowel (10), where there is a through hole (16), aligned with the said fittings (14-15) and with the threaded hole (13) so that the two dowels can be joined with a screw (17), thus completing the assembly of the said structure (5).

Figure 7:
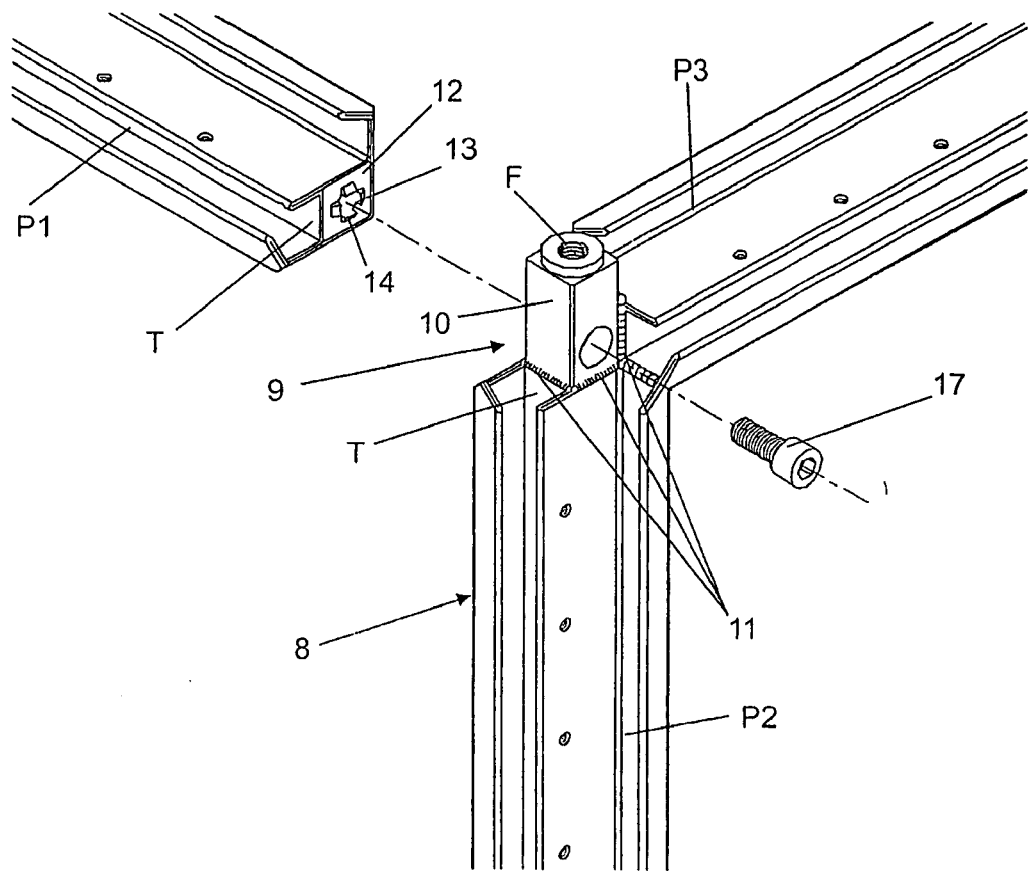
FIG. 7 is an exploded view of the same corner as shown in FIGS. 5 and 6, but, in this case the said corner is semi-assembled highlighting the fact that the assembly makes a rectangular frame.
Figure 8:
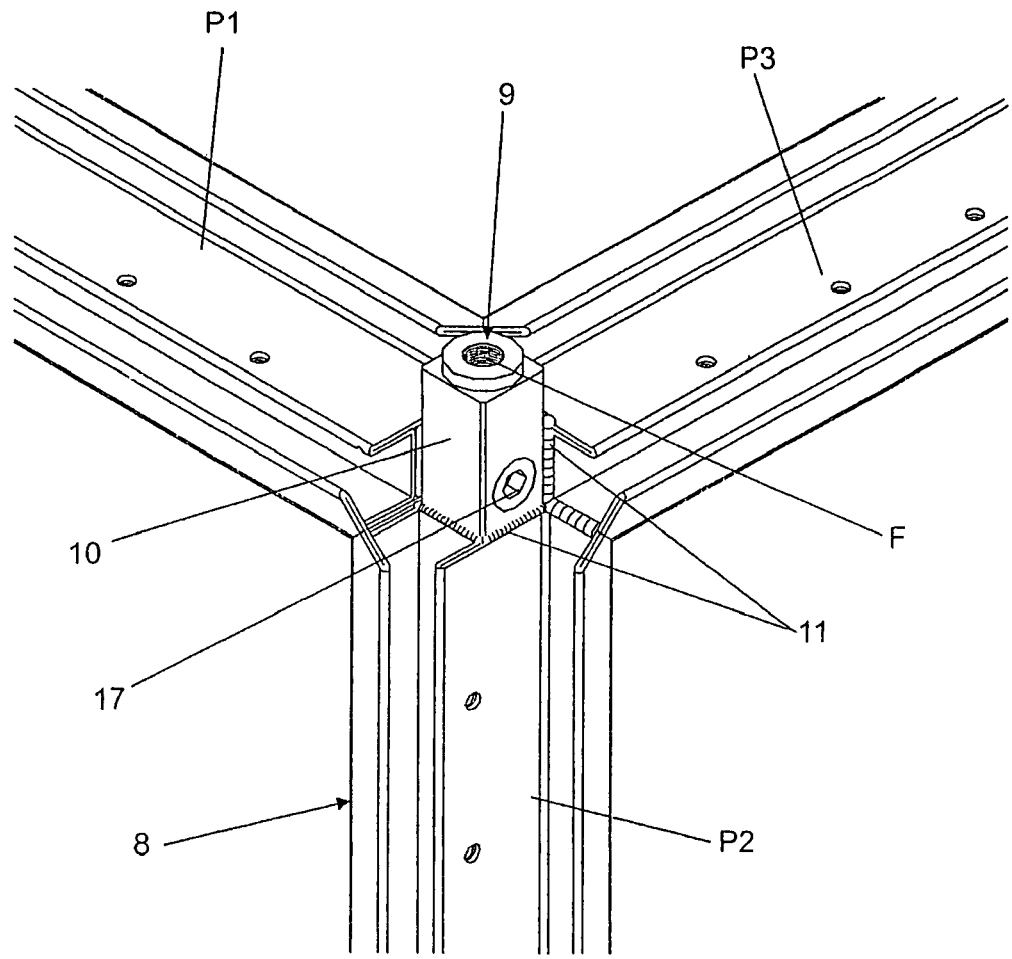
FIG. 8 is a view showing one corner of the structure completely assembled.

In this first assembly, illustrated in an expanded manner in FIGS. 7 and 8, it is noted that each frame (8) is rigidly mounted, transforming it into a single piece after it is welded (11) and with this, its four sides with the device (9) confer means so that two equal frames (8) may be interlinked by the cross sections (P1), which are attached only by screws (17), where fastening is completed with anti-rotational locking afforded by the top fittings (14-15), which also function as self-centering elements for the said screws (17) which after being inserted finalize the assembly of a structure (5) which is really very rigid and stable.

Figure 9:
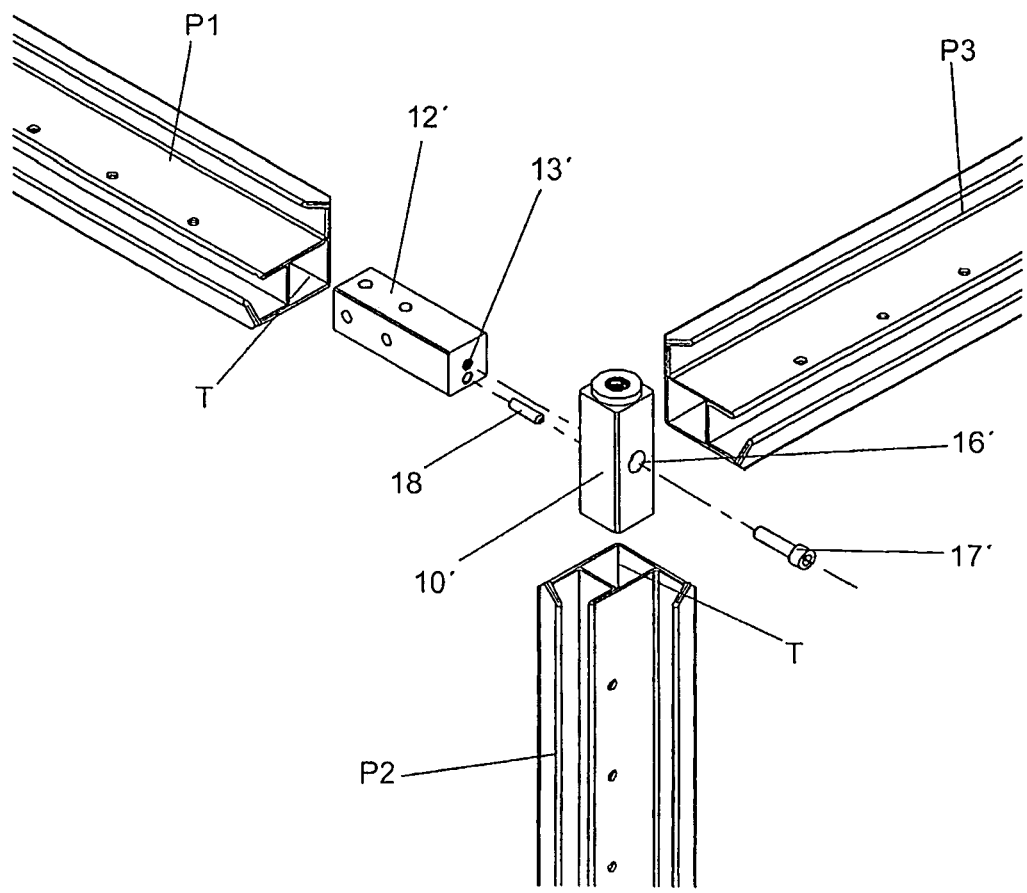
FIG. 9 is an exploded view showing the components which make up one corner of the structure according to a first construction variation.
Figure 10:
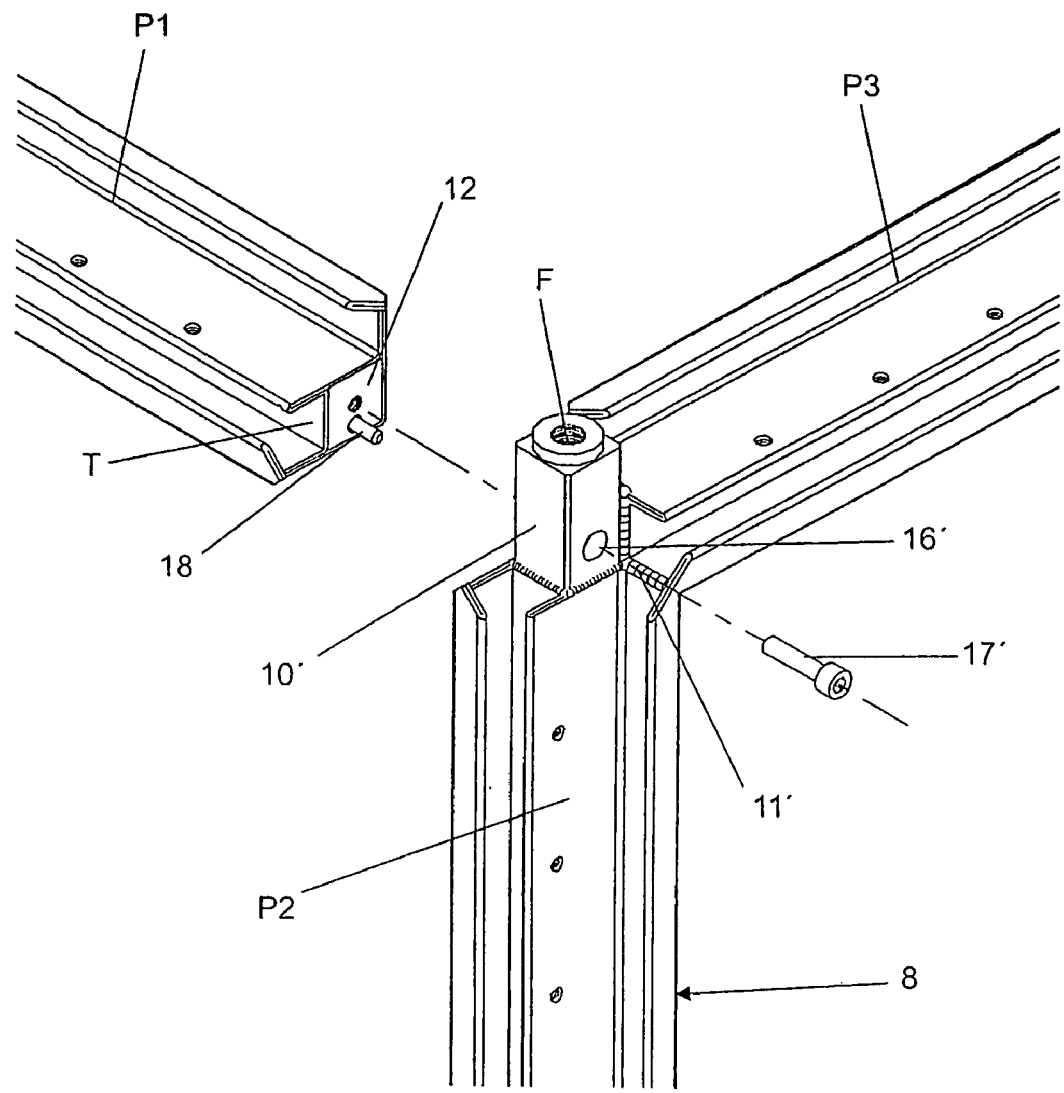
FIG. 10 shows a view of the same corner illustrated in FIG. 9, but, in this case it is semi-assembled.
Figure 11:
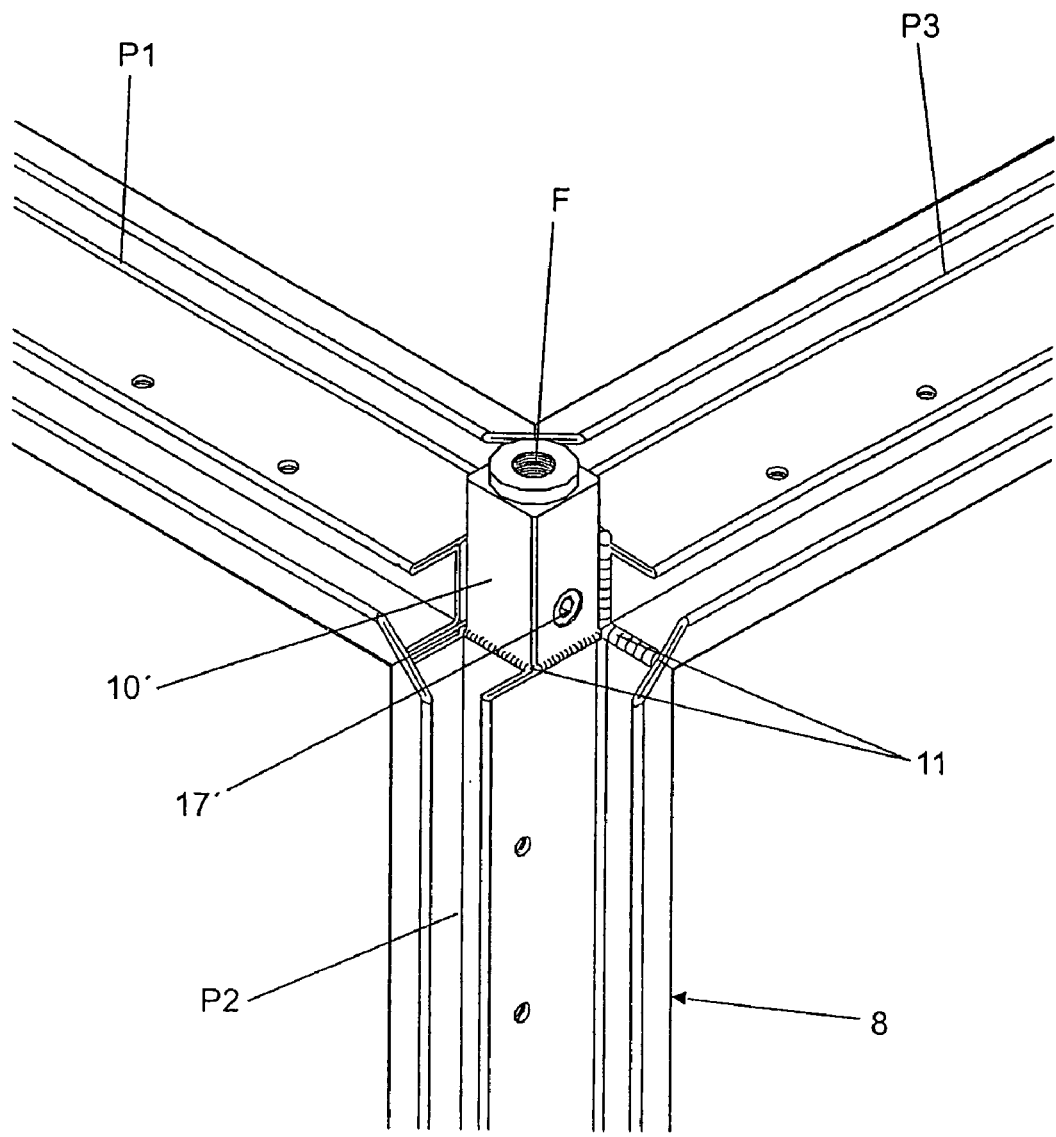
FIG. 11 is a view in perspective of the corner shown in FIGS. 9 and 10, but, in this case it is completely assembled.

In another illustrated constructive variation in FIGS. 9, 10 and 11, the pre-fitting between two dowels is carried out by an off center pin (18) which on the one end penetrates and is attached to a suitable hole existing on the top of the dowel (12'), whilst the other end penetrates equally in another existing guide hole in the side of the dowel (10'), in a way characterising a pre-adjustment between the two parts before inserting the screw (17'), which penetrates into a threaded hole (13') and a smooth hole (16') existing in the dowels (12') and (10'), respectively, completing the fastening of the unit, just as in the previous constructive version.

The second constructive version above presents the same advantages of the previous one as in this case as shown in FIG. 10, the pre-assembly takes place to form the frame (8) following which the assembly of the set is completed by fastening the cross sections (P1).

Figure 12:
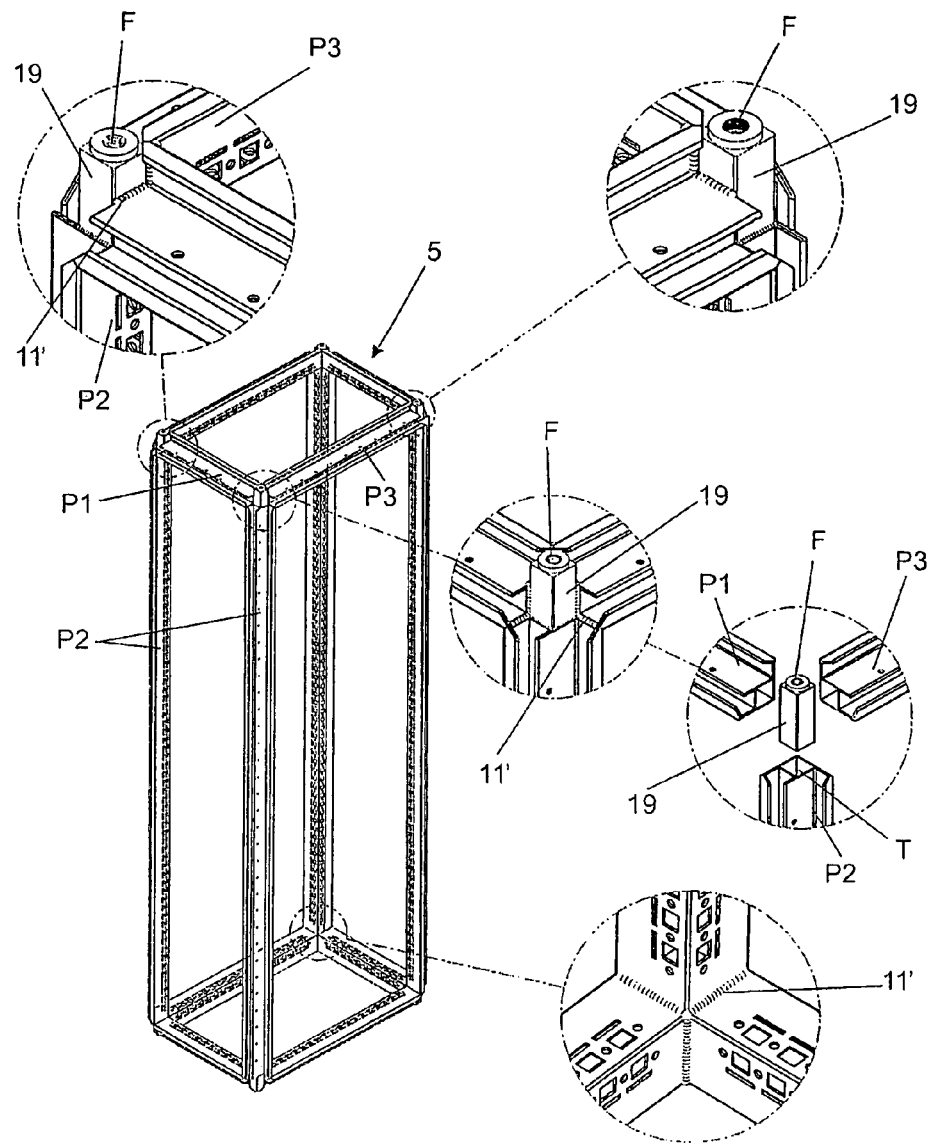
FIG. 12 Illustrates a view in perspective of the structure obtained with the cross section in question, this structure is partially exploded and, still, in this same view are shown amplified details of all corners, where the junction of the cross sections are obtained according to a construction variation.
Figure 13:
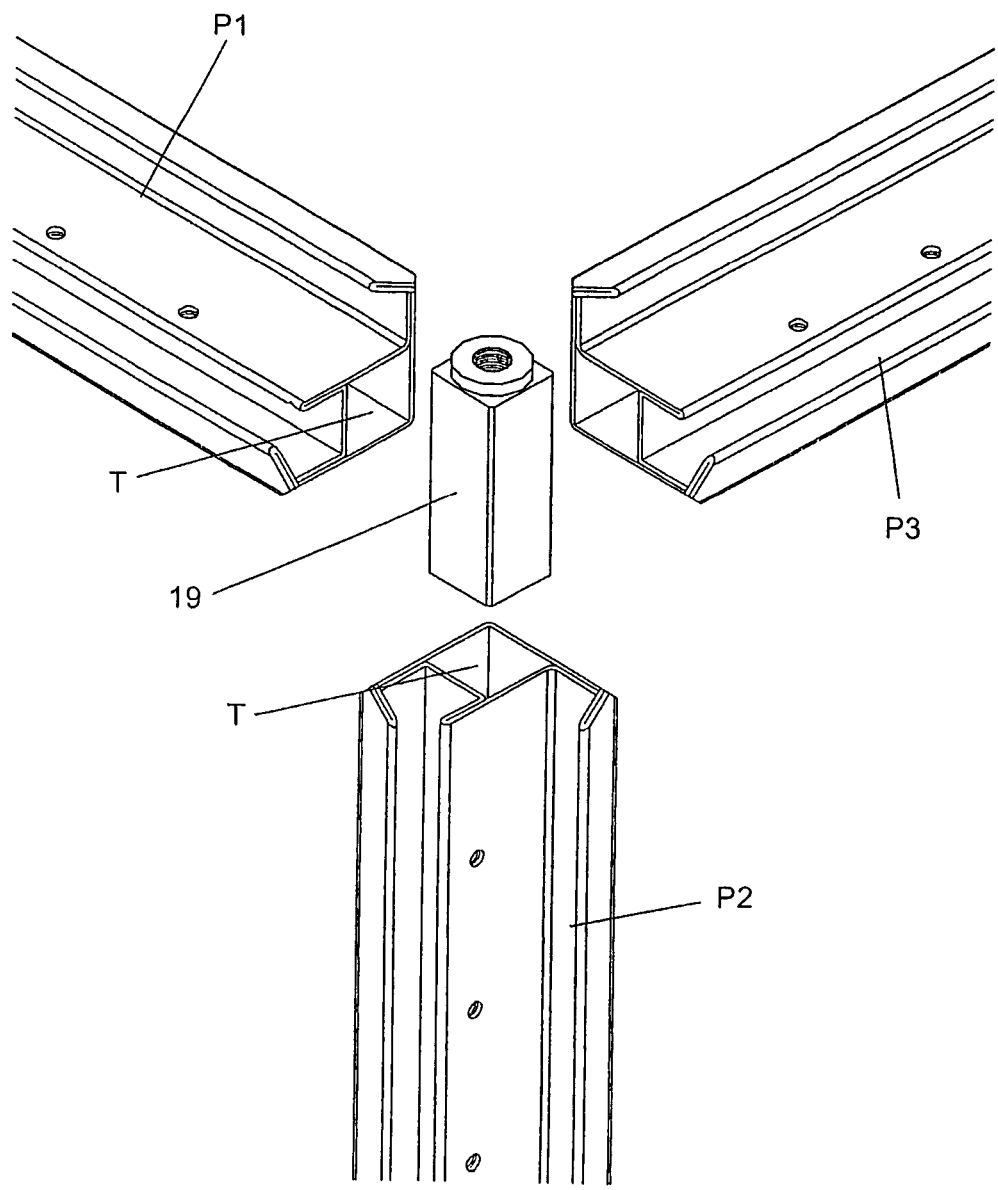
FIG. 13 shows a view from an exploded perspective of one of the structure's corners, highlighting the referred to construction variation and in this case the component used for interlinking by welding the three cross sections which make up the referred to corner.
Figure 14:
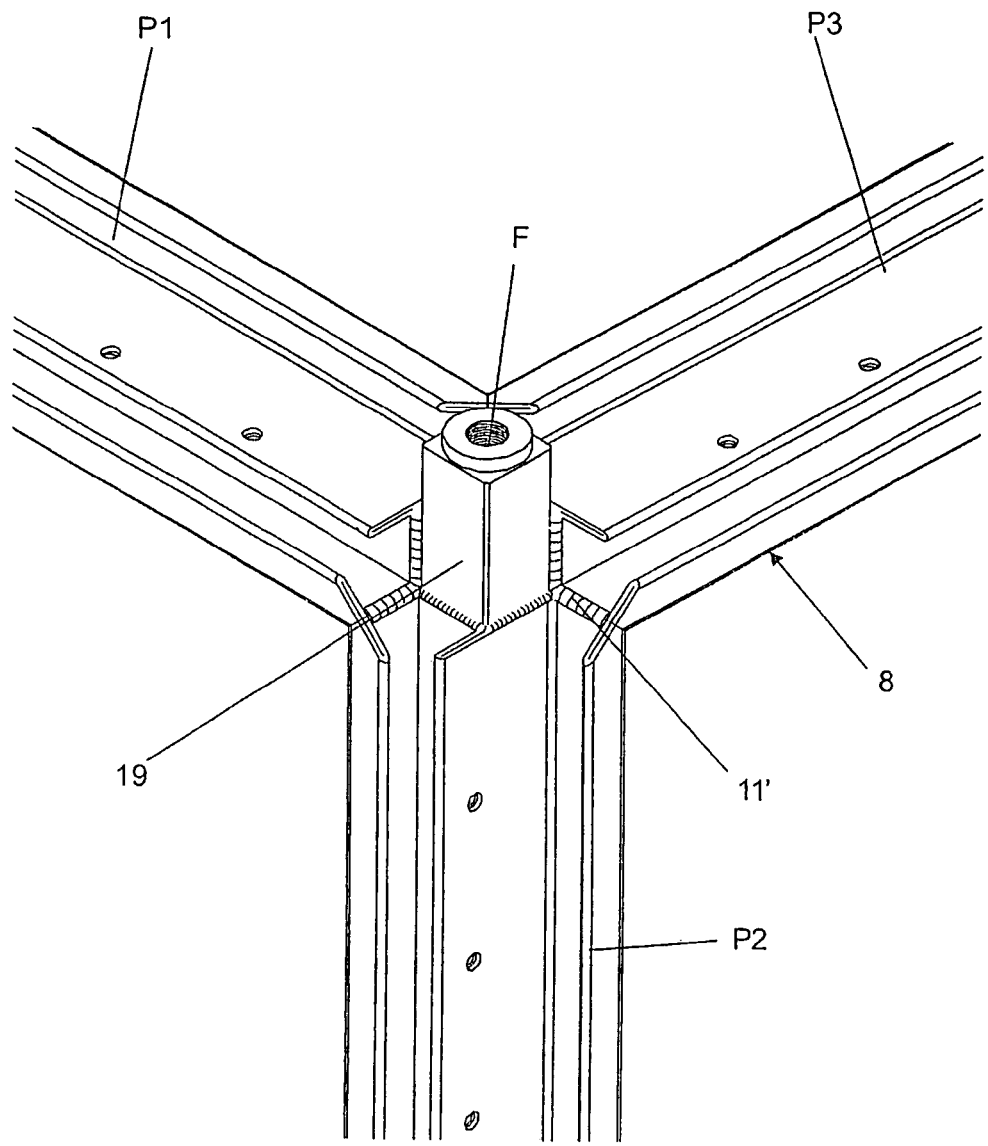
FIG. 14 represents a view from a totally assembled perspective of the corner shown in the previous figure.
Figure 15:
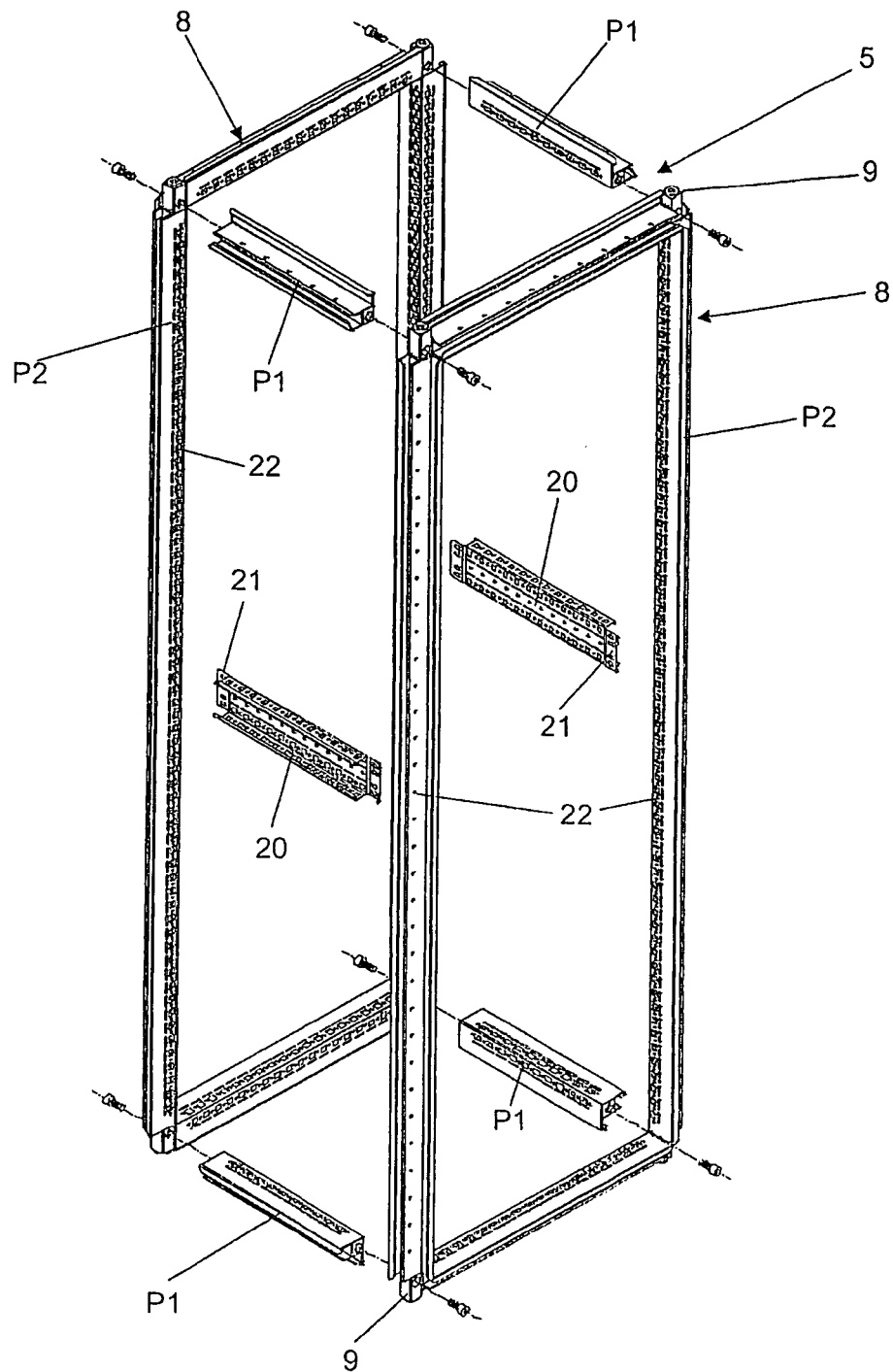
FIG. 15 illustrates a view in perspective of the partially exploded structure, highlighting the use of a crossbeam for complementary locking and assembly of the panel's internal components.

In relation to FIGS. 12, 13 and 14, in a last constructive variation a dowel is fitted (19) geometrically equal to the previous ones but only with a threaded hole (F), as this dowel also (19) presents a compatible dimensioning so that its lower end may penetrate the tubular part (T) of the cross section (P2), whilst its upper point remains positioned between the ends of the other two cross sections (P1-P3), where the said dowel configures a joining knot between the three cross sections, being that this join is made as shown in FIG. 14, by welds (11') applied to all the edges of the said cross sections, including those that are in contact with the referred to dowel (19).

Reporting on FIGS. 1 and 2, the threaded holes (F) serve only for fastening the usual hoisting eyes (I).

In relation to the figures from 15 to 21, this is an integral part of the set for at least one pair of internal crossbeams (20), folded from sheets, presenting a transversal section ordinarily in "U", which are positioned at any point along the height of the cross sections (P2), logically on the same plane, that is, the one side is aligned with the opposite side. Such crossbeams serve for complementary locking of the structure (5) and also serve mainly for the mounting of the internal components to be installed inside the cabinet nevertheless these also add a considerable effect to the structure of the unit.

In conventional panels the said crossbeams exist for the same finality, also inclusively with the effect of improving the structural resistance of the unit, its ands also have wings (21)

to be fastened down with screws on the corresponding vertical cross sections (P2) and for this end the said cross sections, have rows of different openings (22).

To fasten conventional crossbeams the assembler is obliged to remain holding it in the same assembly position with at least one hand, so that with the other hand he is able to insert the screws and give it the final tightening to it.

Figure 16:
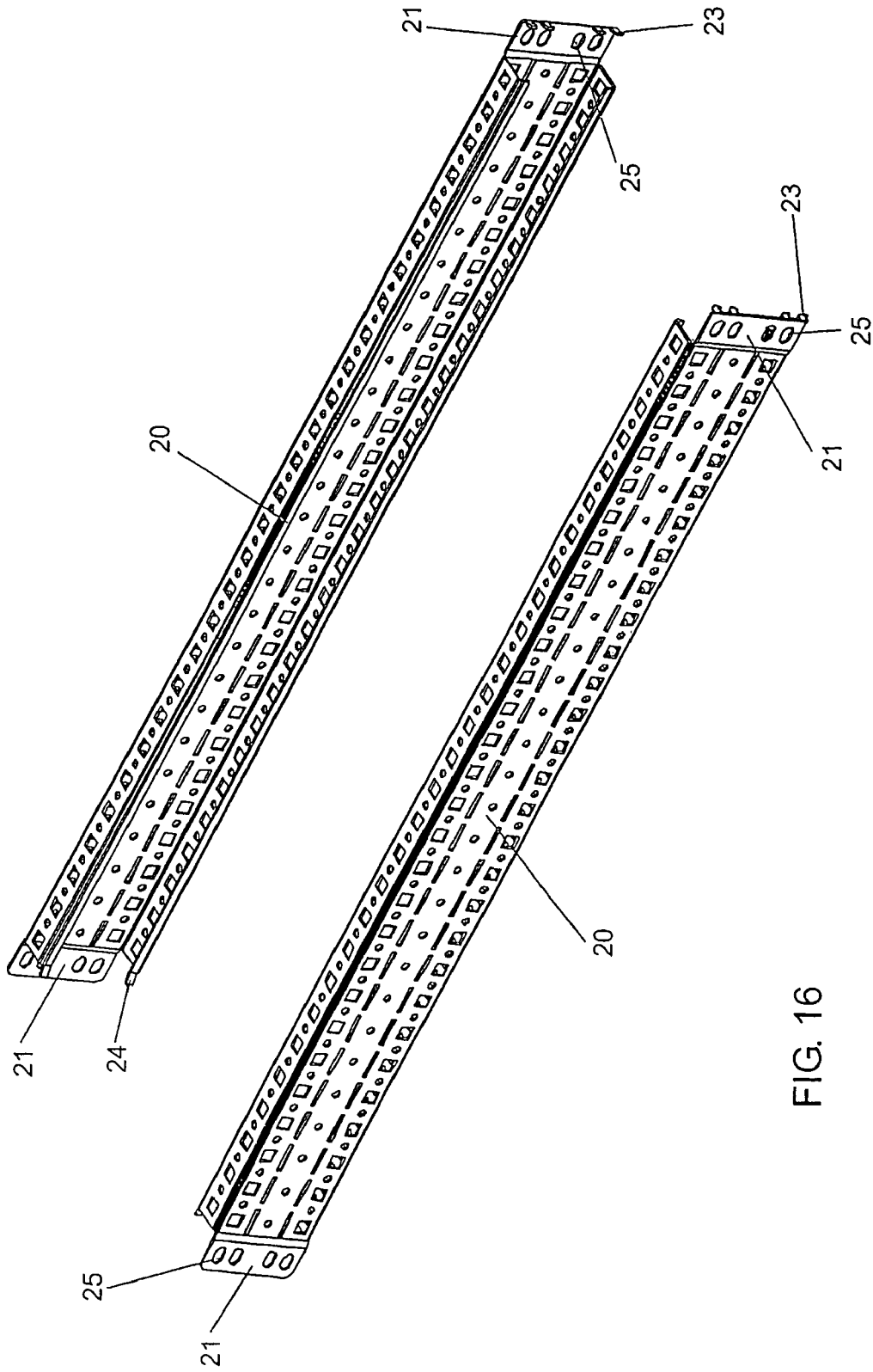
FIG. 16 is a view in perspective showing the constructive details of the crossbeam.
Figure 17:
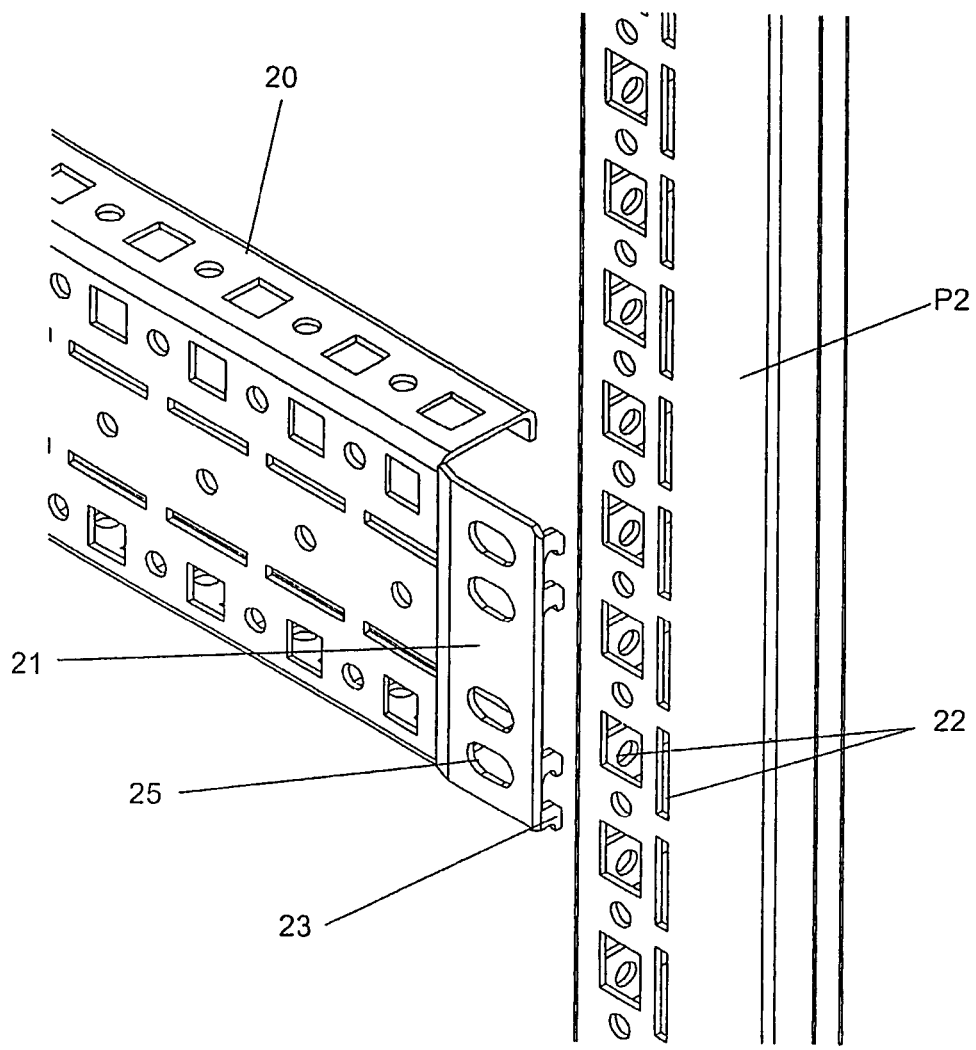
FIGS. 17 to 22 are the views from different angles, highlighting the joints and coupling between the referred to cross beam and the vertical cross sections of the structure.
Figure 18:
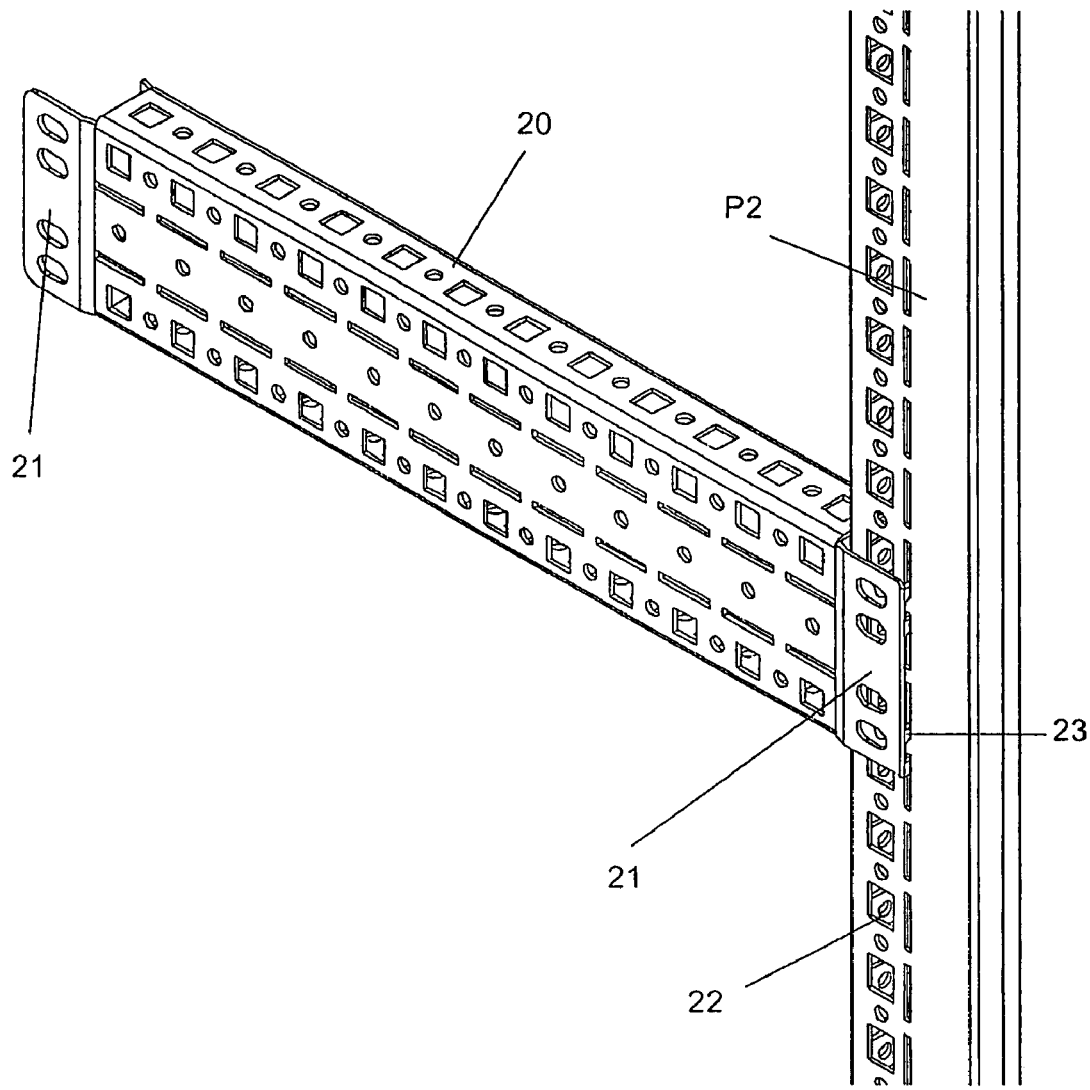
Figure 19:
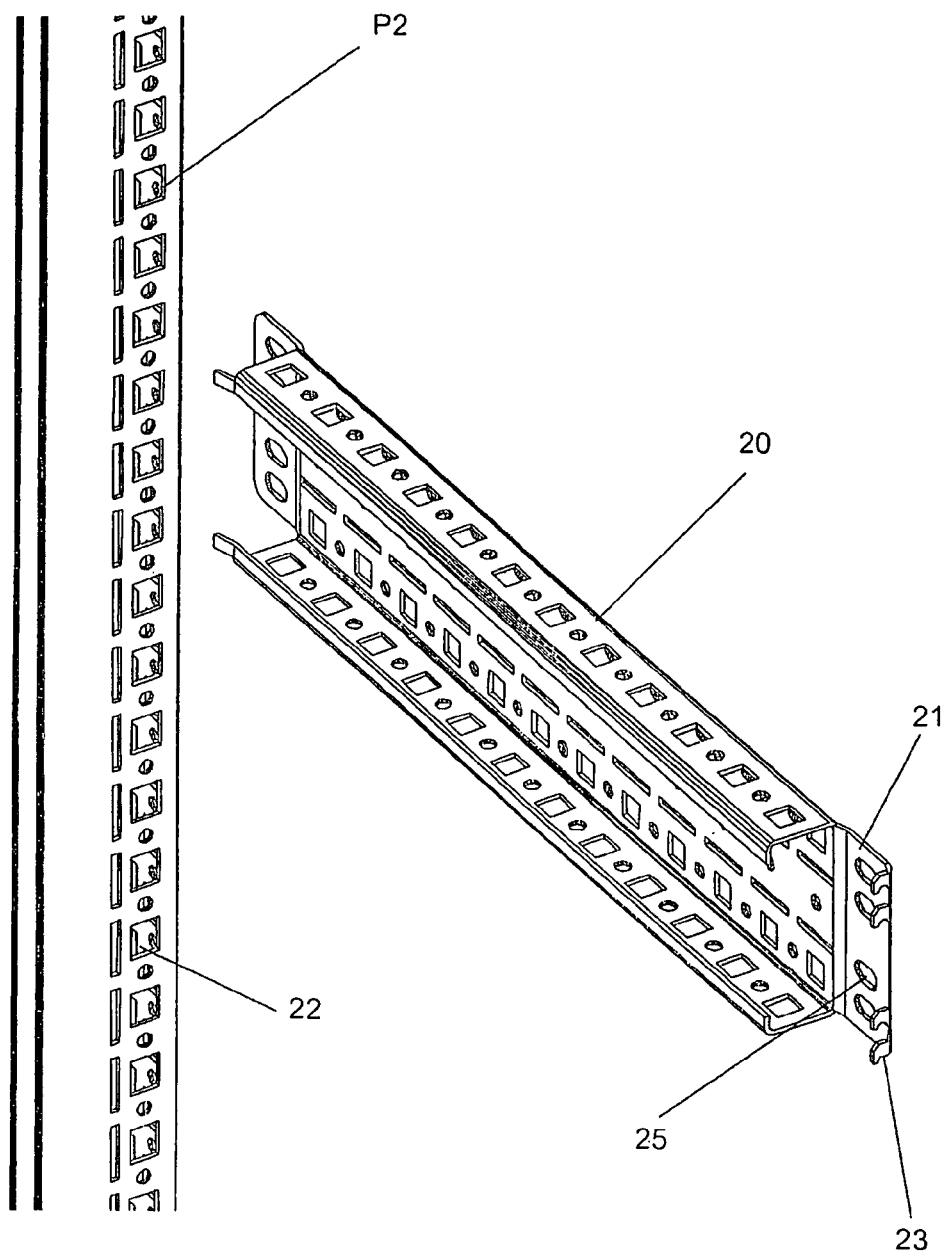
Figure 20:
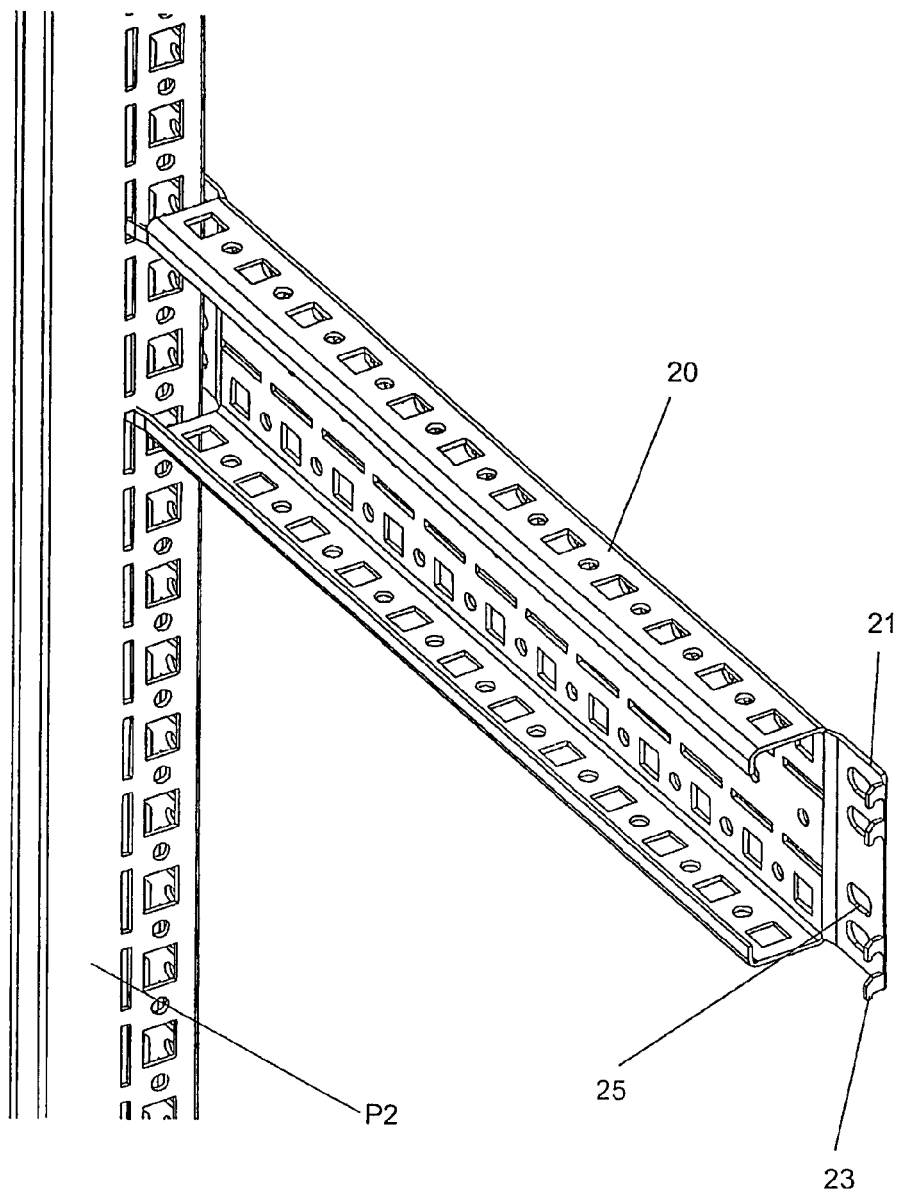
Figure 21:
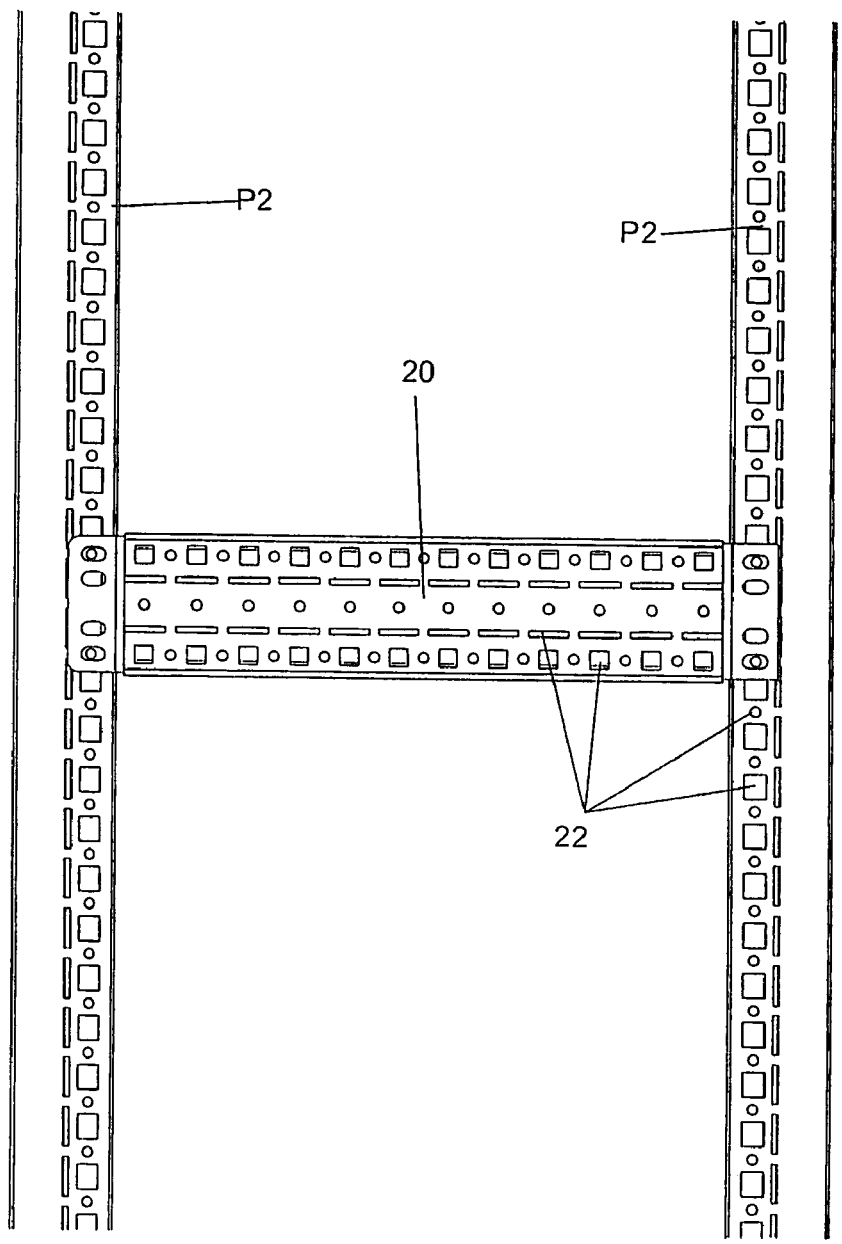

In the current invention the said crossbeams (20) were modified to improve its utilisation even more, as is shown in FIG. 16, at the two ends there are two sets of anchoring grips, one set is provided for on one of the wings (21) or more precisely on its vertical border where the grips are presented in the form of two pairs of "L" shaped teeth (23) designed perpendicularly and inwardly, whilst on the side opposing the grips, presented in the form of two small shafts (24), these are the grips (23), as illustrated in FIGS. 17 to 21, and penetrate the corresponding openings (22), permitting a firm coupling of the cross beam (20), keeping it positioned so that its fastening may be completed with the use of screws in other openings (25) existing in the wings (21) and in the metallic cross sections (P2), thus concluding another construction detail, which besides the advantage of affording a considerable increase to the structure's resistance, it also speeds up and facilitates the mounting of the said crossbeams, seeing that they themselves have their own resources to be pre-positioned inside the structure, in a way also this resource facilitates the choice of the exact assembly point of the said crossbeams, as, has already been said these may also be positioned along the entire height of the cross sections (P2), where a variation from one point to another are a few millimeters, consequently the pre-fastening afforded by the grips facilitate in a way the positioning of the said crossbeams.

Figure 22:
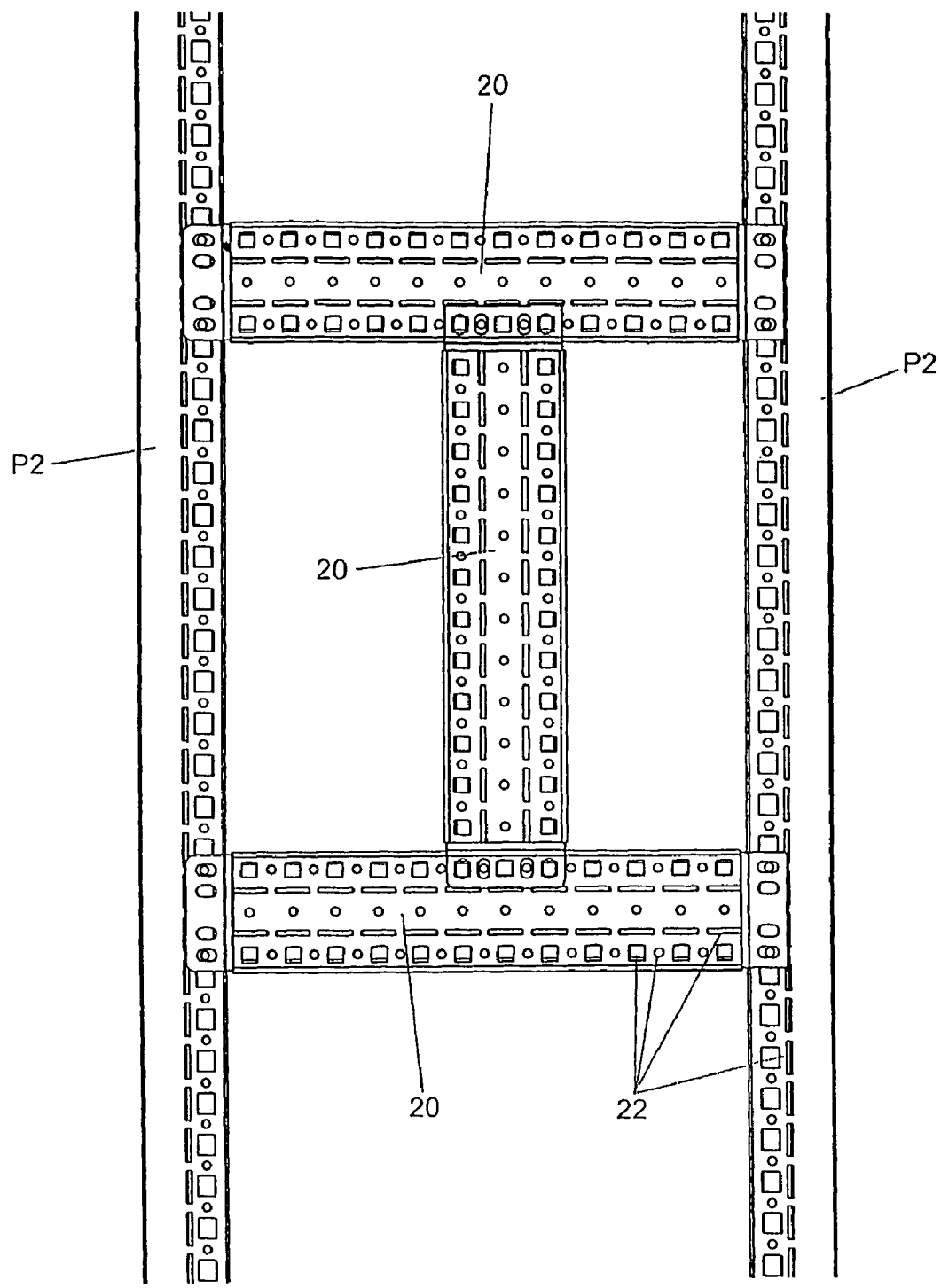

In relation to FIG. 22, at least one crossbeam (20) may be positioned vertically between the other two vertical crossbeams (20), as all of them are equally equipped with different and cooperating openings for the fitting of the grips (23) and of the ends (24), thus offering one more mounting option for the said crossbeams (20), logically with the objective of increasing even more the efficiency of the internal anchoring layout and fastening of the electrical and electronic devices to be mounted inside the panel.

As can be perceived after what has been put forward and illustrated the current improvement concretises all the previously listed advantages and adds others which are not to be found in conventional structures, that is, besides significantly improving the resistance of the structure (5), it also allows for a first and second construction versions, with it being supplied unassembled, consequently, the stocking and moving of the unit is substantially facilitated, as the reduction in space favours and reduces the final transport cost.

Logically the improvement affected different objectives, not only with reference to the final manufacturing and transport costs, but also in the means for speeding up the manufacturing process and assembly of the unit, both at the factory as well as the final user.

The invention claimed is:

1. A metallic structure for use in manufacturing an electrical cabinet, wherein the electrical cabinet comprises a metallic box having a plurality of side enclosures and at least one tilting door (3) having a lock (4), the at least one tilting door having at least one hinge for hingedly mounting the door to the metallic box, the metallic box having an upper enclosure and a lower enclosure supported by a base, the metallic structure supporting the side enclosures, upper enclosure, lower enclosure, the base, and the at least one tilting door, the metallic structure comprising:

an internal metallic cross sectional structure (5), having means for supporting the side enclosures, upper enclosure, lower enclosure and the base, the internal metallic cross sectional structure having means for supporting and mounting the at least one door and its respective hinge, the metallic cross sectional structure having means for mounting electric and electronic components within the metallic box;

said internal metallic cross sectional structure (5) having two uprights (P2) and two cross sectional pieces (P3) assembled into a first rectangular frame and two uprights and two cross sectional pieces assembled into a second rectangular frame, which form two opposite sides of the cross sectional structure (5), each corner point of each junction of each rectangular frame (8) having a coupling device (9) having means for interlinking at a 90° angle at least one upright (P2) with a cross sectional piece (P3) of each frame (8), at least four cross sectional connectors (P1) being completely free while each cross sectional piece is rigidly integrated into two equal rectangular frames (8), each coupling device (9) further having means for coupling the corners of the respective rectangular frames (8) together through each cross sectional connector (P1) to form a rectangular metallic support structure and thereby complete the assembly of the internal cross sectional structure (5) for forming the metallic box, wherein each upright (P2) has a square tubular opening, and wherein the coupling device (9) is a square dowel (10) having a substantially constant cross-section, said square dowel having a lower end tightly fitted inside the square tubular opening (T) of the upright (P2) and an upper portion sufficiently exposed to a height compatible to the adjacent cross sectional piece (P3), the coupling device having a vertically oriented threaded hole (F) at its upper end;

the upper portion of each coupling device having exposed surfaces located adjacent and welded to the respective cross sectional pieces (P3), thereby forming said substantially rigid rectangular frames (8), each coupling device having a horizontal through hole (16), each cross sectional connector (P1) having a mating dowel (12) fitted therein, each mating dowel having a longitudinal threaded hole (13) therein, and having means for aligning the longitudinal threaded hole with the horizontal through hole of the respective coupling device (14), a screw (17) passing through the horizontal through hole for fixing the coupling device to the mating dowel (12) and thereby to the cross sectional connectors (P1), and, wherein the means for aligning comprise self locking fittings extending from a surface of the mating dowel, the coupling device having receptacles for receiving the self locking fittings therein.

2. The metallic structure according to claim 1 further comprising at least one pair of internal locatable crossbeams (20), presenting a transversal U-shaped section, each crossbeam having a pair of wings (21) at the ends thereof fastenable with screws to the uprights (P2), the uprights having a plurality of openings for adjustably locating the position of the cross beams within the metallic structure, the pair of crossbeams mountable horizontally in a facing relation for mounting components within the metallic box, at least one wing of each crossbeam having two "L" shaped teeth (23) extending perpendicularly inwardly, opposite wings of each crossbeam having two small shafts (24) extending therefrom, the uprights having openings for receiving the teeth and shafts therein.

3. The metallic structure according to claim 2 wherein at least two crossbeams are mounted horizontally, one above another, and further comprising at least one crossbeam (20) mounted vertically between the two horizontal crossbeams (20), each crossbeam having openings for accepting the respective teeth and shafts therein.

4. A metallic structure for use in manufacturing an electrical cabinet, wherein the electrical cabinet comprises a metallic box having a plurality of side enclosures and at least one tilting door (3) having a lock (4), the at least one tilting door having at least one hinge for hingedly mounting the door to the metallic box, the metallic box having an upper enclosure and a lower enclosure supported by a base, the metallic structure supporting the side enclosures, upper enclosure, lower enclosure, the base, and the at least one tilting door, the metallic structure comprising:

an internal metallic cross sectional structure (5), having means for supporting the side enclosures, upper enclosure, lower enclosure and the base, the internal metallic cross sectional structure having means for supporting and mounting the at least one door and its respective hinge, the metallic cross sectional structure having means for mounting electric and electronic components within the metallic box;

said internal metallic cross sectional structure (5) having two uprights (P2) and two cross sectional pieces (P3) assembled into a first rectangular frame and two uprights and two cross sectional pieces assembled into a second rectangular frame, which form two opposite sides of the cross sectional structure (5), each corner point of each junction of each rectangular frame (8) having a coupling device (9) for interlinking at a 90° angle at least one upright (P2) with a cross sectional piece (P3) of each frame (8), at least four cross sectional connectors (P1) being completely free while each cross sectional piece is rigidly integrated into the two rectangular frames (8), each coupling device (9) having means for coupling the corners of the respective rectangular frames (8) together through each cross sectional connector (P1) to form a rectangular metallic support structure and thereby complete the assembly of the internal cross sectional structure (5) for forming the metallic box, wherein each upright (P2) has a square tubular opening, and wherein the coupling device (9) is a square dowel (10) having a substantially constant cross-section, said square dowel having a lower end tightly fitted inside the square tubular opening (T) of the upright (P2) and an upper portion sufficiently exposed to a height compatible to the adjacent cross sectional piece (P3), the coupling device having a vertically oriented threaded hole (F) at its upper end;

the upper portion of having exposed surfaces located adjacent and welded to the respective cross sectional pieces (P3), thereby forming said substantially rigid rectangular frames (8), each coupling device having a horizontal through hole (16), each cross sectional connector (P1) having a mating dowel (12) fitted therein, each mating dowel having a longitudinal threaded hole (13) therein, and having means for aligning the longitudinal threaded hole with the horizontal through hole of the respective coupling device (14), a screw (17) passing through the horizontal through hole for fixing the coupling device to the mating dowel (12) and thereby to the cross sectional connectors (P1), and, wherein the means for aligning comprise an off center pin (18) which has a first end disposed within a hole in the mating dowel and a second end receivable in a guide hole provided in a side of the coupling device.

5. The metallic structure according to claim 4 further comprising at least one pair of internal locatable crossbeams (20), presenting a transversal U-shaped section, each crossbeam having a pair of wings (21) at the ends thereof fastenable with screws to the uprights (P2), the uprights having a plurality of openings for adjustably locating the position of the cross beams within the metallic structure, the pair of crossbeams mountable horizontally in a facing relation for mounting components within the metallic box, at least one wing of each crossbeam having two "L" shaped teeth (23) extending perpendicularly inwardly, opposite wings of each crossbeam having two small shafts (24) extending therefrom, the uprights having openings for receiving the teeth and shafts therein.

6. The metallic structure according to claim 5 wherein at least two crossbeams are mounted horizontally, one above another, and further comprising at least one crossbeam (20) mounted vertically between the two horizontal crossbeams (20), each crossbeam having openings for accepting the respective teeth and shafts therein.

* * * * *